United States Patent [19]
Queveau et al.

[11] Patent Number: 6,092,335
[45] Date of Patent: Jul. 25, 2000

[54] TRUNK LID FOR CONVERTIBLE VEHICLE WITH FOLDING ROOF, ADAPTED TO OPEN FROM THE REAR TOWARD THE FRONT AND FROM THE FRONT TOWARD THE REAR

[75] Inventors: Gérard Queveau; Paul Queveau; Jean-Marc Guillez, all of Cerizay, France

[73] Assignee: France Design, Cerizay, France

[21] Appl. No.: 09/289,028

[22] Filed: Apr. 9, 1999

[30] Foreign Application Priority Data

Apr. 9, 1998 [FR] France .................................. 98 04476

[51] Int. Cl.⁷ ..................................................... E05F 15/52
[52] U.S. Cl. ......................... 49/192; 49/280; 296/107.08; 296/76
[58] Field of Search .............................. 49/193, 192, 382, 49/280; 296/76, 107.08, 136

[56] References Cited

U.S. PATENT DOCUMENTS

| | | |
|---|---|---|
| 2,768,024 | 10/1956 | Spear, Jr. ........................... 296/107.08 |
| 3,081,078 | 3/1963 | Lohr .......................................... 49/280 |
| 3,343,303 | 9/1967 | Wanlass .................................... 49/280 |
| 4,739,585 | 4/1988 | Pickles ..................................... 49/280 |
| 5,551,743 | 9/1996 | Klein et al. ............................... 296/76 |
| 5,655,331 | 8/1997 | Schrader et al. ......................... 49/280 |
| 5,769,483 | 6/1998 | Danzl et al. ....................... 296/107.08 |
| 5,788,312 | 8/1998 | Lee ........................................... 49/280 |
| 5,823,606 | 10/1998 | Schenk et al. ..................... 296/107.08 |
| 5,864,214 | 1/1999 | Brodsky ............................. 296/107.08 |

*Primary Examiner*—Daniel P. Stodola
*Assistant Examiner*—Curtis A. Cohen
*Attorney, Agent, or Firm*—Kenyon & Kenyon

[57] ABSTRACT

A trunk lid for a convertible vehicle with a folding roof can be opened on the one hand for stowing the folded roof in the trunk and on the other hand to obtain access to the trunk from the rear for stowing luggage. The front and rear edges of the trunk lid are connected to the bodyshell of the vehicle by latches which either lock or articulate the trunk lid so that it can open either from the front toward the rear or from the rear toward the front.

7 Claims, 2 Drawing Sheets

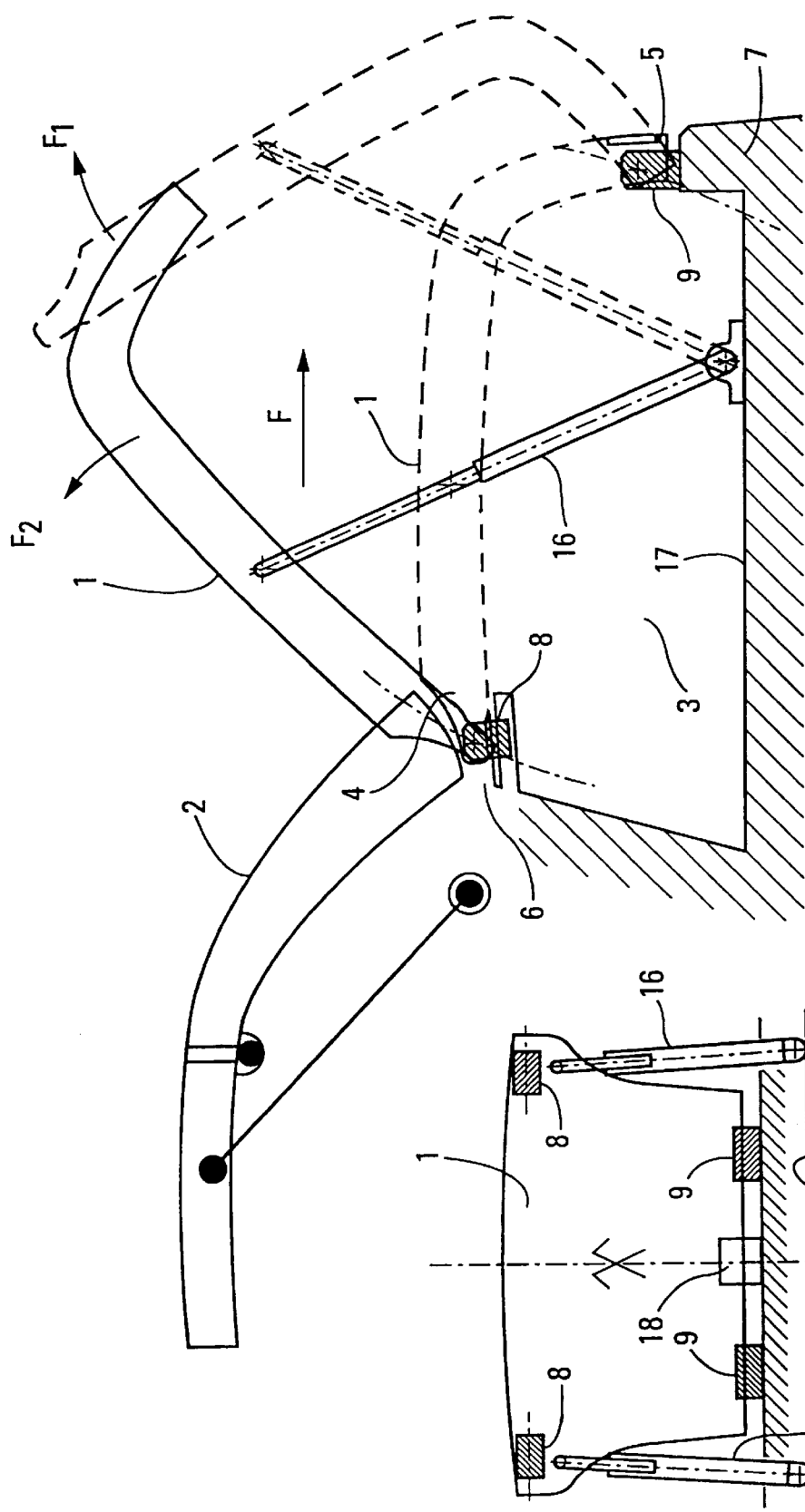

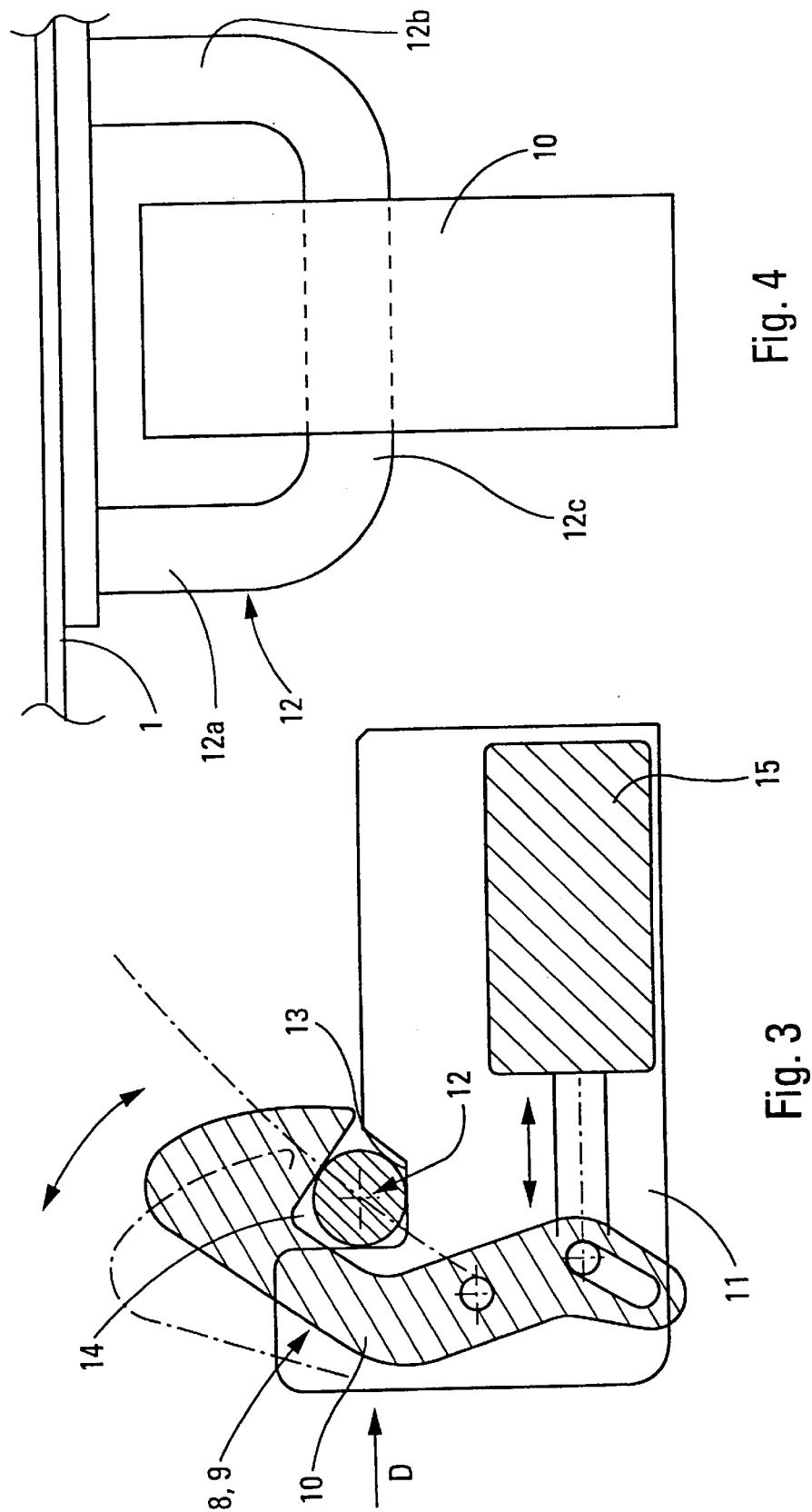

TRUNK LID FOR CONVERTIBLE VEHICLE WITH FOLDING ROOF, ADAPTED TO OPEN FROM THE REAR TOWARD THE FRONT AND FROM THE FRONT TOWARD THE REAR

BACKGROUND OF THE INVENTION

1. Field of the Invention

The present invention concerns a trunk lid for a convertible vehicle with a folding roof, comprising means for opening the trunk on the one hand for stowing the folded roof in the trunk and on the other hand to provide access to the trunk for stowing luggage.

2. Description of the Prior Art

The trunk lid of an automobile vehicle normally opens from the rear toward the front, which facilitates stowing luggage.

To stow the folded roof of a convertible vehicle it is necessary to be able to open the trunk from the front toward the rear. This is not convenient for stowing luggage, however.

A trunk lid has therefore been proposed which can open from the rear toward the front for stowing luggage and from the front toward the rear for stowing the folded roof of the convertible vehicle.

However, the above solution complicates the construction of the trunk lid.

The aim of the present invention is to create a trunk lid of simple construction and which opens only one way to fulfill both functions optimally, namely stowing the folded roof and stowing luggage.

SUMMARY OF THE INVENTION

A trunk lid in accordance with the invention for a convertible vehicle with a folding roof comprises means for opening the trunk lid on the one hand for stowing the folded roof in the trunk and on the other hand to obtain access to the trunk from the rear for stowing luggage and the front and rear edges of the trunk lid are connected to the bodyshell of the vehicle by latches which either lock or articulate the trunk lid so that it can open either from the front toward the rear or from the rear toward the front.

Accordingly, when the trunk lid opens from the front toward the rear, for stowing the folded roof, the latches adjacent the front edge of the trunk lid are unlocked and the latches adjacent the rear edge of the trunk lid are locked and enable the trunk lid to pivot.

Conversely, when the trunk lid opens from the rear toward the front for stowing luggage, the latches adjacent the front edge of the trunk lid are locked and enable the trunk lid to pivot while the latches adjacent the rear edge of the trunk lid are unlocked.

In an advantageous version of the invention the front edge and the rear edge are each connected to the bodyshell by a pair of spaced latches, one of the pairs of latches constituting an articulation in the locked position when the other pair of latches is in the unlocked position, and vice versa.

In a preferred version of the invention each latch includes a hook articulated to a first member attached to the bodyshell and a second member attached to the trunk lid, said hook being able to pivot between a first position, in which it is interengaged with said second member but allows it to rotate relative to the hook and said first member, and a second position, in which said second member is free relative to the hook and said first member.

The hook is preferably pivoted between said first and second positions by an electric, hydraulic or pneumatic actuator.

The trunk lid is preferably opened from the front toward the rear or from the rear toward the front by an electric-hydraulic or hydro-pneumatic actuator comprises a hook 10 articulated to a first member 11 attached to the bodyshell 6, 7 and a second member 12 attached to the trunk lid 1. The hook 10 can pivot between a first position, in which it is interengaged with the second member 12 but enables the latter to rotate relative to the hook 10 and the first member 11, and a second position, in which the second member 12 is free relative to the hook 10 and the first member 11.

FIG. 3 shows that the first member 11 includes a notch 13 defining with the hook 10 in the locked position a housing 14 for the second member 12 enabling it to rotate.

FIG. 4 shows that the second member 12 is U-shaped with two branches 12a, 12b fixed to the trunk lid 1 and a part 12c linking the two branches 12a, 12b of the U-shape interengaged with the hook when the latter is in the locked position.

The hook 10 is pivoted between the first and second positions mentioned above by an electrical, hydraulic or pneumatic actuator 15 fixed to the member 11, for example, which can be a housing.

FIG. 1 shows that opening of the trunk lid 1 from the front toward the rear or from the rear toward the front is commanded by an electro-hydraulic or hydro-pneumatic actuator 16 articulated to the trunk lid 1 and to a part of the bodyshell adjacent the bottom 17 of the trunk 3.

The operation of the trunk lid just described will now be explained.

To obtain access to the trunk 3 of the vehicle from the rear, the bottom rear latches 9 are opened by a standard pushbutton 18 on the axis of the trunk lid 1. The pushbutton 18 operates the electrical actuator 15 of the latch 9 but could equally control the latch manually through an appropriate mechanical system.

In this situation the front top latches 8 are locked and the member 12 fixed to the trunk lid 1 pivots in the housing 14 formed by the member 11 and the hook 10.

The electric actuator 16 (in the assisted version) pushes the trunk lid 1 upward so that it opens from the rear toward the front.

To stow the roof 2 in the trunk 3 the movements are reversed. A pushbutton inside the vehicle opens the front top latches 8.

In this situation the rear bottom latches 9 are locked and the member 12 of the trunk lid 1 pivots in the housing 14 formed by the member 11 and the hook 10.

The electric actuator 16 (in the assisted version) then pushes the trunk lid 1 upward and the lid opens from the front toward the rear.

In both cases the movements are reversed to close the trunk lid.

In both cases, for non-assisted operation, the electrical latches can be replaced by standard cableoperated latches. In this case the actuators are merely balancing units.

Of course, the invention is not limited to the embodiment just described to which many modifications can be made without departing from the scope of the invention. articulated to the trunk lid and to a part of the bodyshell adjacent the bottom of the trunk.

Other features and advantages of the invention will become more apparent in the following description.

BRIEF DESCRIPTION OF THE DRAWINGS

In the accompanying drawings, which are given by way of non-limiting example:

FIG. 1 is a diagrammatic view partly in longitudinal section of a convertible vehicle equipped with a trunk lid in accordance with the invention;

FIG. 2 is a view in the direction of arrow F from FIG. 1 with the trunk lid closed;

FIG. 3 is a side view showing the detail of a latch; and

FIG. 4 is a view in the direction of the arrow D in FIG. 3.

DETAILED DESCRIPTION OF THE PREFERRED EMBODIMENT

Referring to FIG. 1, the trunk lid 1 for a convertible vehicle with folding roof 2 comprises means for opening the trunk lid 1 for stowing the folded roof 2 inside the trunk 3 and to obtain access to the trunk from the rear for stowing luggage.

In accordance with the invention, the front edge 4 and the rear edge 5 of the trunk lid 1 are connected to the bodyshell 6, 7 of the vehicle by latches 8, 9 which either lock the trunk lid 1 or articulate it so that it can open either from the front toward the rear (arrow F1) or from the rear toward the front (arrow F2).

As shown in FIG. 2, the front edge 4 and the rear edge of the trunk 1 are each connected to the bodyshell by means of a pair of spaced latches 8, 9, one of the pairs of latches 8, 9 constituting an articulation in the locked position when the other pair of latches 8, 9 is in the unlocked position, and vice versa.

As shown in FIGS. 3 and 4, each latch 8, 9

There is claimed:

1. A trunk lid for a convertible vehicle with a folding roof, comprising means for selectively said trunk lid to position said trunk lid in either a first position for stowing the folded roof in a trunk or in a second position for accessing the trunk from a rear of the trunk for stowing luggage, wherein each of a front edge and a rear edge of said trunk lid include a first latch, each of said first latches including a first member adapted to be pivotally connected to a bodyshell of the vehicle and a second member attached to said trunk lid;

wherein when said trunk lid is moved to said first position:
said first member of said first latch of said rear edge is pivoted to a first position in which said first member is interengaged with said second member of said first latch of said rear edge and in which said second member rotates relative to said first member, and said first member of said first latch of said front edge is pivoted to a second position in which said second member of said first latch of said front edge is free relative to said first member; and wherein when said trunk lid is moved to said second position:
said first member of sad first latch of said front edge is pivoted to a first position in which said first member is interengaged with said second member of said first latch of said front edge and in which said second member rotates relative to said first member, and said first member of said first latch of said rear edge pivots to a second position in which said second member of said first latch of said rear edge is flee relative to said first member.

2. The trunk lid claimed in claim 1 wherein said front edge and said rear edge are each adapted to be connected to the bodyshell by a second latch, said respective first and second latches for each of said front edge and said rear edge constituting a pair of spaced latches, one of said pairs of latches constituting an articulation in a locked position when the other pair of latches is in an unlocked position, and vice versa.

3. The trunk lid claimed in claim 1 wherein said first member of each of said first latches includes a hook articulated to a member adapted to be attached to the bodyshell.

4. The trunk lid claimed in claim 3 wherein said member includes a notch defining with said hook in said first position of said hook a housing for said second member enabling it rotate.

5. The trunk lid claimed in claim 3 wherein said second member is U-shaped with two branches fixed to said trunk lid and a part connecting said two branches of said U-shape is interengaged with said hook when said hook is in said first position.

6. The trunk lid claimed in claim 3 wherein said hook is pivoted between said first and second positions by an electric, hydraulic or pneumatic actuator.

7. The trunk lid claimed in claim 1 wherein said means for opening includes an electric-hydraulic or hydro-pneumatic actuator articulated to said trunk lid and adapted to be articulated to a part of the bodyshell adjacent a bottom of the trunk.

* * * * *